(12) United States Patent
Kim et al.

(10) Patent No.: US 9,969,255 B2
(45) Date of Patent: May 15, 2018

(54) POWER TRANSMISSION SYSTEM OF HYBRID ELECTRIC VEHICLE

(71) Applicant: Hyundai Motor Company, Seoul (KR)

(72) Inventors: Shin Jong Kim, Gyeonggi-do (KR); Taewon Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/267,897

(22) Filed: Sep. 16, 2016

(65) Prior Publication Data

US 2017/0305255 A1    Oct. 26, 2017

(30) Foreign Application Priority Data

Apr. 26, 2016    (KR) ................ 10-2016-0050530

(51) Int. Cl.
| | |
|---|---|
| *B60K 6/383* | (2007.10) |
| *B60K 6/365* | (2007.10) |
| *B60K 6/445* | (2007.10) |
| *B60K 6/52* | (2007.10) |
| *F16H 3/10* | (2006.01) |
| *F16H 3/72* | (2006.01) |
| *F16H 3/46* | (2006.01) |
| *B60K 6/40* | (2007.10) |

(52) U.S. Cl.
CPC ............. *B60K 6/365* (2013.01); *B60K 6/383* (2013.01); *B60K 6/40* (2013.01); *B60K 6/445* (2013.01); *F16H 3/46* (2013.01); *F16H 3/728* (2013.01); *B60Y 2200/92* (2013.01); *B60Y 2400/427* (2013.01); *B60Y 2400/73* (2013.01); *F16H 2200/0021* (2013.01); *F16H 2200/2005* (2013.01); *F16H 2200/2066* (2013.01); *F16H 2200/2082* (2013.01); *Y10S 903/91* (2013.01); *Y10S 903/913* (2013.01)

(58) Field of Classification Search
CPC ......... F16H 220/2066; F16H 220/2082; F16H 2200/2005; F16H 3/728; B60K 6/365; B60K 6/383; B60Y 2400/73; Y10S 903/91

See application file for complete search history.

(56) References Cited

U.S. PATENT DOCUMENTS

| | | | | |
|---|---|---|---|---|
| 2004/0121870 | A1* | 6/2004 | Takenaka | B60K 6/26 475/5 |
| 2015/0167807 | A1* | 6/2015 | Ahn | B60K 6/365 475/5 |
| 2015/0167808 | A1* | 6/2015 | Kim | B60K 6/365 475/5 |
| 2016/0061305 | A1* | 3/2016 | Kim | F16H 37/046 475/5 |

FOREIGN PATENT DOCUMENTS

| | | |
|---|---|---|
| JP | 11-334397 A | 12/1999 |
| JP | 2001-233070 A | 8/2001 |

(Continued)

*Primary Examiner* — Ramya P Burgess
*Assistant Examiner* — Lillian T Nguyen
(74) *Attorney, Agent, or Firm* — Brinks Gilson & Lione

(57) ABSTRACT

The present disclosure provides a power transmission apparatus for a hybrid vehicle including a one-directional rotation limiting device disposed on an engine torque delivery path so as to prevent a torque from reversely transmitting from the final drive gear to the planetary gear set.

6 Claims, 4 Drawing Sheets

(56) References Cited

FOREIGN PATENT DOCUMENTS

| JP | 2013-095386 A   | 5/2013 |
|----|-----------------|--------|
| JP | 2015-33915 A    | 2/2015 |
| JP | 2016-43858      | 4/2016 |
| KR | 10-1028403 B1   | 4/2005 |
| KR | 10-2015-0061676 A | 6/2015 |
| KR | 10-1592636 B1   | 2/2016 |

* cited by examiner

POWER TRANSMISSION SYSTEM OF HYBRID ELECTRIC VEHICLE

CROSS-REFERENCE TO RELATED APPLICATION

This application claims priority to and the benefit of Korean Patent Application No. 10-2016-0050530, filed on Apr. 26, 2016, the entire contents of which are incorporated herein by reference.

FIELD

The present disclosure relates to a power transmission apparatus for a hybrid vehicle.

BACKGROUND

The statements in this section merely provide background information related to the present disclosure and may not constitute prior art.

Environmentally-friendly technology for vehicles is important in the automobile industry, and advanced car makers have focused their energy on the development of an environmentally-friendly vehicle to achieve environmental and fuel efficiency regulations.

Therefore, car makers have developed an electric vehicle (EV), a hybrid electric vehicle (HEV), a fuel cell electric vehicle (FCEV), and the like, as environmentally-friendly vehicle technologies.

Since all vehicles have various technological restrictions such as a weight and cost, the vehicle makers have paid attention to the hybrid electric vehicle as an alternative for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electric energy are mixed and used as the power sources.

The hybrid electric vehicle generally uses an engine and a motor/generator, and uses as a primary power source a motor/generator having a relatively excellent low-speed torque characteristic at a low speed and uses as the primary power source an engine having a relatively excellent high-speed torque characteristic at a high speed.

As a result, the hybrid electric vehicle is useful in fuel efficiency enhancement and reduction of exhaust gas because an operation of the engine using fossil fuel stops and the motor/generator is used at a low-speed section.

The above information disclosed in this Background section is only for enhancement of understanding of the background of the disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides a power transmission apparatus for a hybrid vehicle having advantages of minimizing power loss caused by a rotation part unrelated to driving the vehicle in an EV mode.

A power transmission apparatus for a hybrid vehicle including an engine as a primary power source and first and second motor/generators as secondary power sources is disclosed. The power transmission apparatus may include a planetary gear set as an engine torque branching device arranged between the first motor/generator and the second motor/generator such that a torque of the engine and a torque of second motor/generator are delivered to a final drive gear through separate and respective paths of an engine torque delivery path and a motor torque delivery path, wherein the engine torque delivery path is a path from the planetary gear set to the final drive gear through an engine output shaft, and the motor torque delivery path is a path from the second motor/generator to the final drive gear through a motor output shaft. The power transmission apparatus may further include a one-directional rotation limiting device disposed on an engine torque delivery path so as to prevent or inhibit a torque from reversely transmitting from the final drive gear to the planetary gear set.

The one-directional rotation limiting device may include a one-way clutch disposed on the engine torque delivery path.

An engine output gear may be integrally formed with the engine output shaft and externally gear-meshed with a power delivery shaft gear of a power delivery shaft connected with the planetary gear set. An intermediate power delivery gear may be rotatably disposed on the engine output shaft and externally gear-meshed with the final drive gear. The one-way clutch may be interposed between the intermediate power delivery gear and the engine output shaft.

An engine output gear may be integrally formed with the engine output shaft and externally gear-meshed with the final drive gear. An intermediate power delivery gear may be rotatably disposed on the engine output shaft and externally gear-meshed with a power delivery shaft gear of a power delivery shaft connected with the planetary gear set. The one-way clutch may be interposed between the intermediate power delivery gear and the engine output shaft.

The one-directional rotation limiting device may be disposed on a power delivery shaft connected with the planetary gear set. An engine output gear of the engine output shaft may be externally gear-meshed with an intermediate power delivery gear and the final drive gear.

A motor output shaft input gear and a motor output shaft output gear may be integrally formed at respective ends of the motor output shaft. The motor output shaft input gear may be externally gear-meshed with a motor shaft gear integrally formed at a second motor shaft of the second motor/generator. The motor output shaft output gear may be externally gear-meshed with the final drive gear.

According to one form of the present disclosure, a torque delivered to the final drive gear from the second motor/generator in an EV driving mode is prevented or inhibited from being reversely transmitted to an engine output shaft, planetary gear set, and first motor/generator.

As a result, a power loss that may be caused by a rotation part unrelated to the EV driving mode may be minimized.

Further, effects that can be obtained or expected from forms of the present disclosure are directly or suggestively described in the following detailed description. That is, various effects expected from the forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
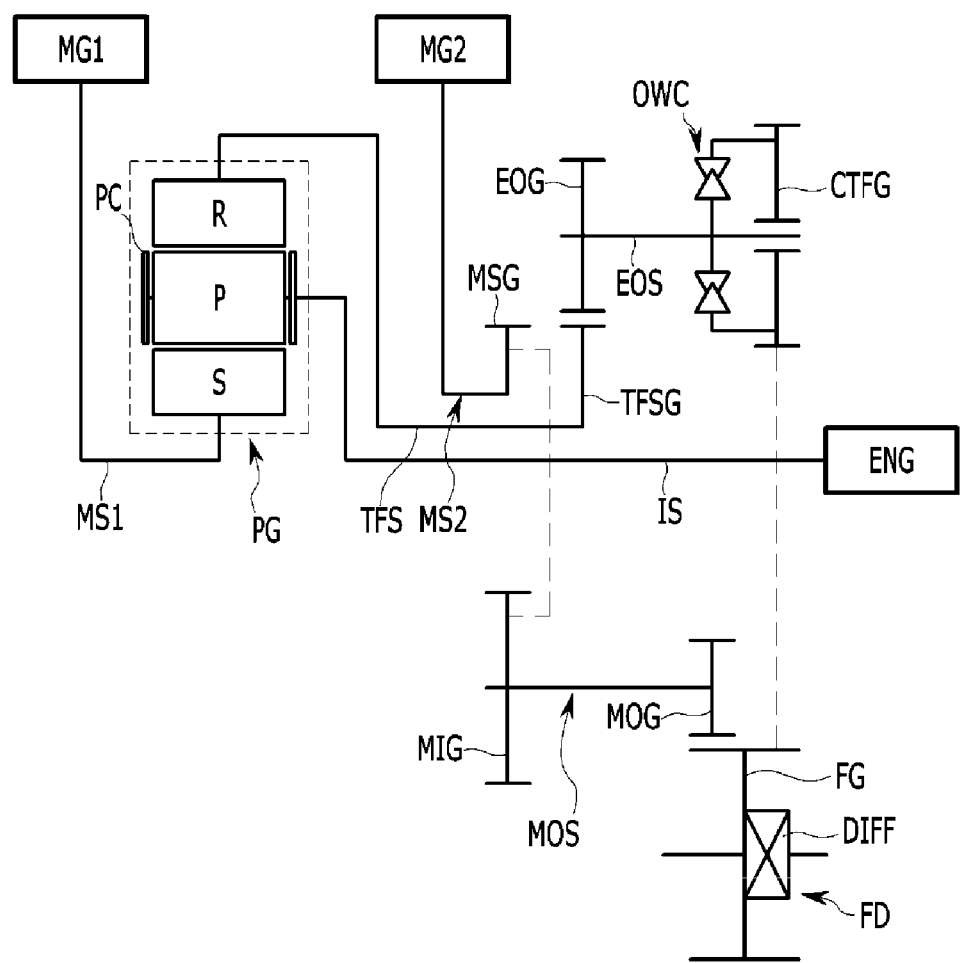
FIG. 1 is a schematic diagram of a power transmission apparatus for a hybrid vehicle according to a first form of the present disclosure.

The drawings described herein are for illustration purposes only and are not intended to limit the scope of the present disclosure in any way.

DESCRIPTION OF SYMBOLS

CTFG: intermediate power delivery gear
EOG: engine output gear
EOS: engine output shaft
FG: final drive gear
IS: input shaft
MG1, MG2: first and second motor/generators
MS1, MS2: first and second motor shafts
MIG: motor output shaft input gear
MOG: motor output shaft output gear
MOS: motor output shaft
MSG: motor shaft gear
OWC: one-way clutch
TFS: power delivery shaft
TFSG: power delivery shaft gear

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which forms of the disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a power transmission apparatus for a hybrid vehicle according to a first form of the present disclosure.

Referring to FIG. 1, a power transmission apparatus for a hybrid vehicle includes power sources of an engine ENG and first and second motor/generators MG1 and MG2, a planetary gear set PG as a torque branching device, and a one-directional rotation limiting device including a one-way clutch OWC and an intermediate power delivery gear CTFG.

The engine ENG is a primary power source and may be various kinds of typical engines such as a gasoline engine or a diesel engine that uses fossil fuel. Torque outputted from the engine ENG is inputted to power transmission apparatus through an input shaft IS.

The first and second motor/generators MG1 and MG2 perform both functions of a motor and a generator. The motor/generators MG1 and MG2 may be formed as known in the art. That is, the motor/generators MG1 and MG2 include a stator fixed to a transmission housing and a rotor rotatable inside the stator. First and second motor shafts MS1 and MS2 are directly connected with the rotors of the motor/generators MG1 and MG2, respectively.

The engine ENG and the first and second motor/generators MG1 and MG2 are arranged on a same axis, and the planetary gear set PG is arranged between the first motor/generator MG1 and the second motor/generator MG2.

The planetary gear set PG is a single pinion planetary gear set, and includes rotational elements of a sun gear S, a planet carrier PC rotatably supporting a pinion P engaged with the sun gear S, and a ring gear R engaged with the pinion P.

In the arrangement of the planetary gear set PG, the sun gear S is directly connected with the first motor/generator MG1 through the first motor shaft MS1, the planet carrier PC is directly connected with the input shaft IS, and the ring gear R is directly connected with a power delivery shaft TFS. The power delivery shaft TFS is a hollow shaft receiving the input shaft IS inside the shaft without interference, and thereby the ring gear R may act as an output element.

A power delivery shaft gear TFSG is integrally formed at an end of the power delivery shaft TFS, and the torque of the engine ENG is transmitted to an engine output shaft EOS therethrough. The second motor shaft MS2 connected with the second motor/generator MG2 is a hollow shaft overlapping the power delivery shaft TFS without an interference, A motor shaft gear MSG is integrally formed at an end of the second motor shaft MS2, and the torque of the second motor/generator MG2 is transmitted to the motor output shaft MOS therethrough.

The engine output shaft EOS is arranged in parallel with the input shaft IS. An engine output gear EOG is integrally formed at one end of the engine output shaft EOS, and a one-directional rotation limiting device is disposed at another end of the engine output shaft EOS. The one-directional rotation limiting device includes a one-way clutch OWC interposed between an intermediate power delivery gear CTFG and the engine output shaft EOS.

The engine output gear EOG is externally gear-meshed with the power delivery shaft gear TFSG of the power delivery shaft TFS, and the intermediate power delivery gear CTFG is externally gear-meshed with the final drive gear FG of the final drive device FD.

As a result, the engine output shaft EOS delivers an engine torque received from the planetary gear set PG to the final drive gear FG of the final drive device FD having the differential DIFF.

The motor output shaft MOS is arranged in parallel with the input shaft IS. A motor output shaft input gear MIG is integrally formed at one end of the motor output shaft MOS and externally gear-meshed with the motor shaft gear MSG. A motor output shaft output gear MOG is integrally formed at another end of the motor output shaft MOS and externally gear-meshed with the final drive gear FG of the final drive device FD.

As a result, the motor output shaft MOS delivers a torque received from the second motor/generator MG2 to the final drive gear FG of the final drive device FD having the differential DIFF.

A power transmission apparatus for a hybrid vehicle according to a first form of the present disclosure described above may drive a vehicle by a same power delivery path as a typical hybrid vehicle.

In addition, a power transmission apparatus for a hybrid vehicle according to a first form of the present disclosure employs a one-directional rotation limiting device including a one-way clutch OWC and an intermediate power delivery gear CTFG is disposed on a power delivery path of the engine ENG. When an engine torque is delivered from the planetary gear set PG, the one-way clutch is locked so that the received torque is delivered to the final drive gear FG. When a torqued is delivered to the one-way clutch from the final drive gear FG, the one-way clutch freely rotates, thereby preventing the torque from delivered to the planetary gear set PG.

Figure 2:
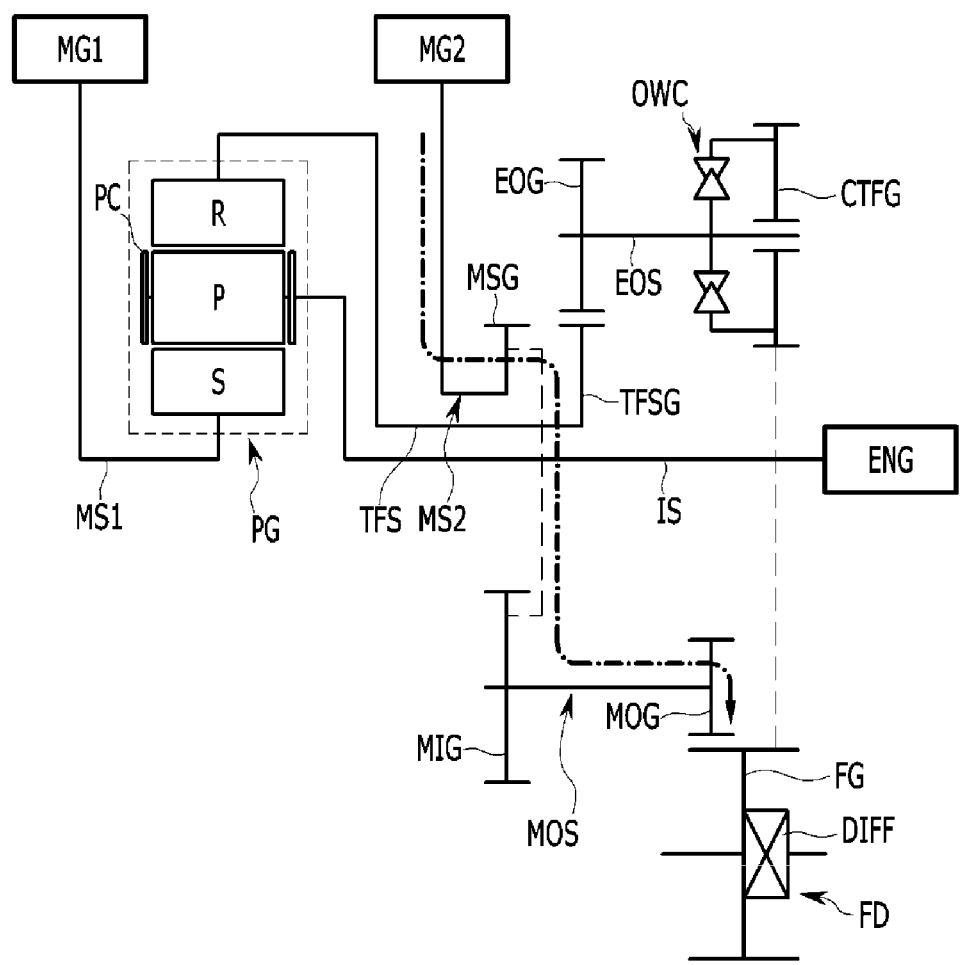
FIG. 2 illustrates a power transmission path in an EV mode of a power transmission apparatus for a hybrid vehicle according to the first form of the present disclosure.

FIG. 2 illustrates a power transmission path in an EV mode of a power transmission apparatus for a hybrid vehicle according to a first exemplary form of the present disclosure.

Referring to FIG. 2, in an EV mode, the engine ENG remains stopped and the second motor/generator MG2 is operated.

As a result, the torque of the second motor/generator MG2 is delivered to the final drive gear FG of the differential DIFF sequentially through the second motor shaft MS2, the motor shaft gear MSG, the motor output shaft input gear MIG, the motor output shaft MOS, and the motor output shaft output gear MOG, thereby moving the vehicle.

In such an EV driving mode, although the torque of the final drive gear FG is delivered to the intermediate power delivery gear CTFG, the torque of the intermediate power delivery gear CTFG is not delivered to the engine output shaft EOS since the one-way clutch OWC is disposed between the engine output shaft EOS and the intermediate power delivery gear CTFG.

Therefore, undesired rotations of the engine output shaft EOS, the planetary gear set PG, and the first motor/generator MG1 may be prevented or inhibited in the EV driving mode, thereby minimizing a loss in power transmission.

A hybrid vehicle power transmission apparatus according to a first form of the present disclosure may be driven in other driving modes and may form power delivery paths depending on the driving modes, according to a known scheme in the art.

Figure 3:
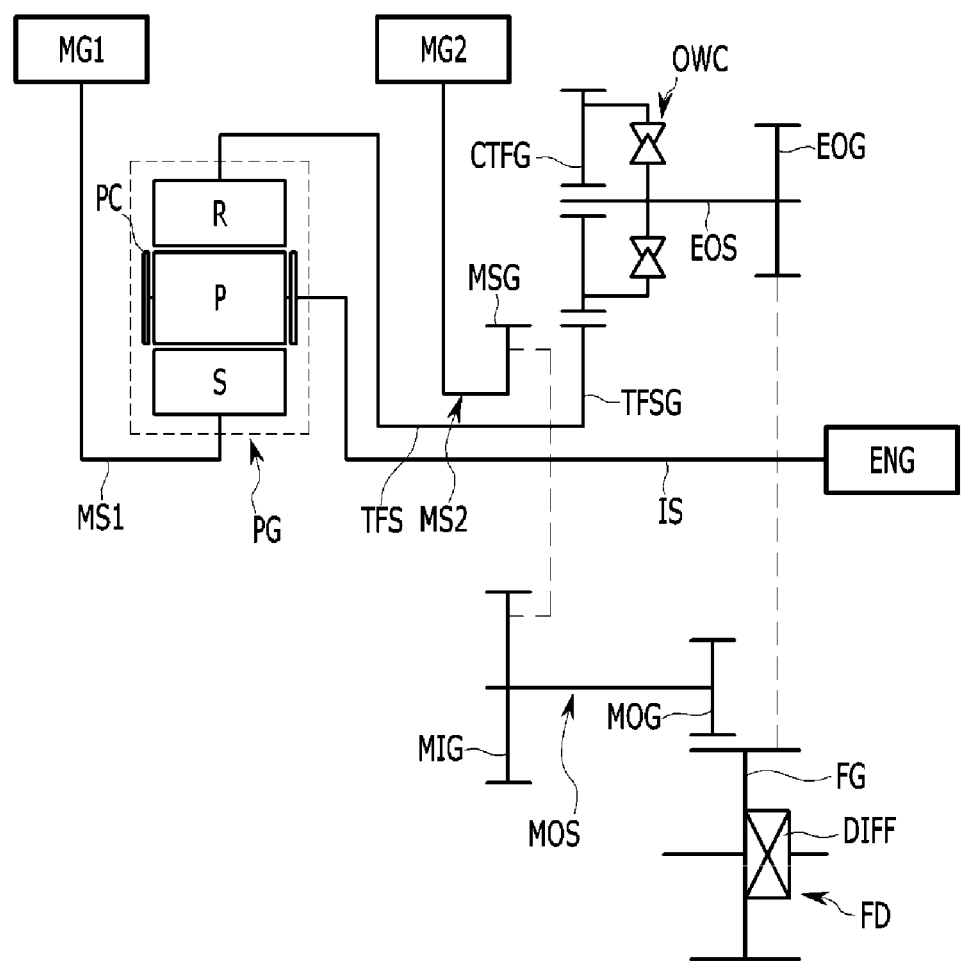
FIG. 3 is a schematic diagram of a power transmission apparatus for a hybrid vehicle according to a second form of the present disclosure.

FIG. 3 is a schematic diagram of a power transmission apparatus for a hybrid vehicle according to a second form of the present disclosure.

In a power transmission apparatus for a hybrid vehicle according to a first form of the present disclosure, the engine output gear EOG of the engine output shaft EOS is externally gear-meshed with the power delivery shaft gear TFSG fixed to the power delivery shaft TFS of the planetary gear set PG, and the intermediate power delivery gear CTFG including the one-way clutch OWC is externally gear-meshed with the final drive gear FG.

However, referring to FIG. 3, in a power transmission apparatus for a hybrid vehicle according to a second form of the present disclosure, the engine output gear EOG of the engine output shaft EOS is externally gear-meshed with the final drive gear FG, and the intermediate power delivery gear CTFG is externally gear-meshed with the power delivery shaft gear TFSG.

As a result, although the location of the engine output gear EOG and the intermediate power delivery gear CTFG are interchanged, the first form of the present disclosure shows a same operation and effect as in the second form.

Figure 4:
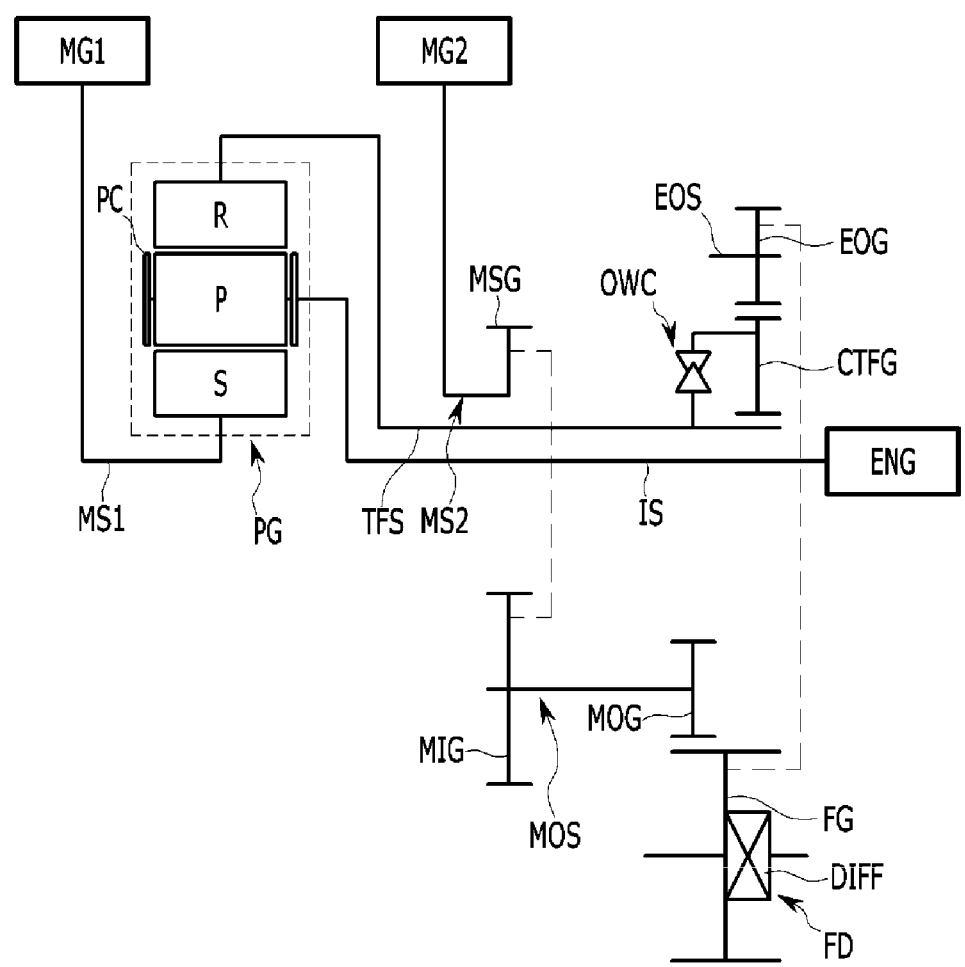
FIG. 4 is a schematic diagram of a power transmission apparatus for a hybrid vehicle according to a third form of the present disclosure.

FIG. 4 is a schematic diagram of a power transmission apparatus for a hybrid vehicle according to a third form of the present disclosure.

In a power transmission apparatus for a hybrid vehicle according to a first form of the present disclosure, the engine output gear EOG of the engine output shaft EOS is externally gear-meshed with the power delivery shaft gear TFSG fixed to the power delivery shaft TFS of the planetary gear set PG, and the intermediate power delivery gear CTFG including the one-way clutch OWC is externally gear-meshed with the final drive gear FG.

However, referring to FIG. 4, in a power transmission apparatus for a hybrid vehicle according to a third form of the present disclosure, a power delivery shaft gear TFSG is omitted in the power delivery shaft TFS, and a one-way clutch OWC is arrange between the power delivery shaft TFS and the intermediate power delivery gear CTFG.

In addition, the engine output gear EOG is fixed to the engine output shaft EOS, and the engine output gear EOG is externally gear-meshed with the intermediate power delivery gear CTFG and the final drive gear FG.

As a result, while the power delivery shaft gear TFSG is omitted, the third form shows a same operation and effect as in the first form.

While this disclosure has been described in connection with what is presently considered to be practical forms, it is to be understood that the disclosure is not limited to the disclosed forms, but, on the contrary, is intended to cover various modifications and equivalent arrangements included within the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A power transmission apparatus for a hybrid vehicle including an engine as a primary power source and first and second motor/generators as secondary power sources, the power transmission apparatus comprising:

a planetary gear set as an engine torque branching device arranged between the first motor/generator and the second motor/generator such that a torque of the engine and a torque of the second motor/generator are delivered to a final drive gear through separate and respective paths of an engine torque delivery path and a motor torque delivery path, the engine torque delivery path being a path from the planetary gear set to the final drive gear through an engine output shaft, the motor torque delivery path being a path from the second motor/generator to the final drive gear through a motor output shaft; and a one-directional rotation limiting device disposed on the engine torque delivery path so as to prevent a torque from reversely transmitting from the final drive gear to the planetary gear set, wherein the one-directional rotation limiting device is disposed between the planetary gear set and the final drive gear in the engine torque delivery path, such that a torque is one-directionally delivered from the planetary gear to the final drive gear.

2. The power transmission apparatus of claim 1, wherein the one-directional rotation limiting device comprises a one-way clutch disposed on the engine torque delivery path.

3. The power transmission apparatus of claim 2, wherein:
an engine output gear is integrally formed with the engine output shaft and externally gear-meshed with a power delivery shaft gear of a power delivery shaft connected with the planetary gear set;
an intermediate power delivery gear is rotatably disposed on the engine output shaft and externally gear-meshed with the final drive gear; and
the one-way clutch is interposed between the intermediate power delivery gear and the engine output shaft.

4. The power transmission apparatus of claim 2, wherein:
an engine output gear is integrally formed with the engine output shaft and externally gear-meshed with the final drive gear;
an intermediate power delivery gear is rotatably disposed on the engine output shaft and externally gear-meshed with a power delivery shaft gear of a power delivery shaft connected with the planetary gear set; and
the one-way clutch is interposed between the intermediate power delivery gear and the engine output shaft.

5. The power transmission apparatus of claim 2, wherein:
the one-directional rotation limiting device is disposed on a power delivery shaft connected with the planetary gear set; and
an engine output gear of the engine output shaft is externally gear-meshed with an intermediate power delivery gear and the final drive gear.

6. The power transmission apparatus of claim 1, wherein:
a motor output shaft input gear and a motor output shaft output gear are integrally formed at respective ends of the motor output shaft;
the motor output shaft input gear is externally gear-meshed with a motor shaft gear integrally formed at a second motor shaft of the second motor/generator; and
the motor output shaft output gear is externally gear-meshed with the final drive gear.

* * * * *